US010363604B2

(12) United States Patent
Kaneko

(10) Patent No.: US 10,363,604 B2
(45) Date of Patent: Jul. 30, 2019

(54) PROGRAM RESUMPTION METHOD OF A LAMINATION MOLDING APPARATUS

(71) Applicant: Sodick Co., Ltd., Kanagawa (JP)

(72) Inventor: Mikio Kaneko, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 291 days.

(21) Appl. No.: 15/384,786

(22) Filed: Dec. 20, 2016

(65) Prior Publication Data

US 2017/0173690 A1 Jun. 22, 2017

(30) Foreign Application Priority Data

Dec. 22, 2015 (JP) .................. 2015-249693

(51) Int. Cl.
| | | |
|---|---|---|
| *B22F 3/105* | (2006.01) | |
| *B33Y 10/00* | (2015.01) | |
| *B33Y 50/02* | (2015.01) | |
| *B33Y 30/00* | (2015.01) | |
| *B29C 64/393* | (2017.01) | |

(52) U.S. Cl.
CPC .......... *B22F 3/1055* (2013.01); *B29C 64/393* (2017.08); *B33Y 10/00* (2014.12); *B33Y 30/00* (2014.12); *B33Y 50/02* (2014.12); *B22F 2003/1056* (2013.01); *B22F 2003/1057* (2013.01); *B22F 2203/03* (2013.01); *B22F 2999/00* (2013.01); *Y02P 10/295* (2015.11)

(58) Field of Classification Search
None
See application file for complete search history.

(56) References Cited

U.S. PATENT DOCUMENTS

| | | | | |
|---|---|---|---|---|
| 4,484,287 A | * | 11/1984 | Gamo ................. | G05B 19/406 219/69.16 |
| 5,663,883 A | * | 9/1997 | Thomas ............... | B29C 64/141 700/119 |
| 5,968,558 A | * | 10/1999 | Kudert ................. | B29C 48/09 425/130 |

(Continued)

FOREIGN PATENT DOCUMENTS

| | | |
|---|---|---|
| JP | S57-60401 A | 4/1982 |
| JP | H10-230328 A | 9/1998 |
| JP | 5721886 A | 1/2016 |

OTHER PUBLICATIONS

Office Action dated Sep. 6, 2016 of corresponding JP application No. 2015-249693; 3 pgs.

*Primary Examiner* — Ramesh B Patel
(74) *Attorney, Agent, or Firm* — Maier & Maier, PLLC

(57) ABSTRACT

A lamination molding apparatus, including a numerical control apparatus configured to form a desired lamination molding object by a repetition in accordance with a main program pre-created and numbered with a sequence number, the main program including a plurality of program lines, wherein the repetition includes forming a material powder layer of a predetermined thickness on a molding table for each divided layer, the molding table being vertically movable, the divided layer being obtained by dividing a shape of the desired lamination molding object at the predetermined thickness; and irradiating a predetermined area of the material powder layer with a laser beam to form a sintered layer.

8 Claims, 11 Drawing Sheets

(56) References Cited

U.S. PATENT DOCUMENTS

| | | | | |
|---|---|---|---|---|
| 6,575,218 | B1* | 6/2003 | Burns | B22F 3/005 |
| | | | | 156/512 |
| 7,607,211 | B2* | 10/2009 | Barlier | B29C 31/041 |
| | | | | 249/78 |
| 7,968,626 | B2* | 6/2011 | Giller | B33Y 70/00 |
| | | | | 524/8 |
| 8,192,664 | B2* | 6/2012 | Polk, Jr. | B29C 31/047 |
| | | | | 264/210.1 |
| 8,529,240 | B2* | 9/2013 | Mayer | B29C 64/106 |
| | | | | 425/145 |
| 9,604,410 | B2* | 3/2017 | Okazaki | B29C 64/153 |
| 2002/0129485 | A1* | 9/2002 | Mok | G05B 19/4099 |
| | | | | 29/527.2 |
| 2003/0167099 | A1* | 9/2003 | Kesavadas | B29C 64/386 |
| | | | | 700/119 |
| 2009/0261067 | A1* | 10/2009 | Dietrich | B26F 3/004 |
| | | | | 216/83 |
| 2015/0367573 | A1* | 12/2015 | Okazaki | B29C 64/153 |
| | | | | 425/174.4 |

* cited by examiner

Fig.10

```
O0000
N00001 G65(SETTBLDN.SDK)A0.050
N00002 G65(INITIAL.SDK)
N00003 G91G28Z0
N00004 G80G90
N00005 G00G54X0Y0
N00006 G65(LASER.SDK)A1
N00007 G65(LASER.SDK)A2
N00008 G65(LASER.SDK)A3
N00009 G65(LASER.SDK)A4
N00010 G65(LASER.SDK)A5
N00011 G65(LASER.SDK)A6
N00012 G65(LASER.SDK)A7
N00013 G65(LASER.SDK)A8
N00014 G65(LASER.SDK)A9
N00015 G65(LASER.SDK)A10
N00016 G65(MACHING.SDK)A32T1
N00017 G65(MACHING.SDK)A33T1
N00018 G65(MACHING.SDK)A35T5
N00019 G65(LASER.SDK)A11
N00020 G65(LASER.SDK)A12
```

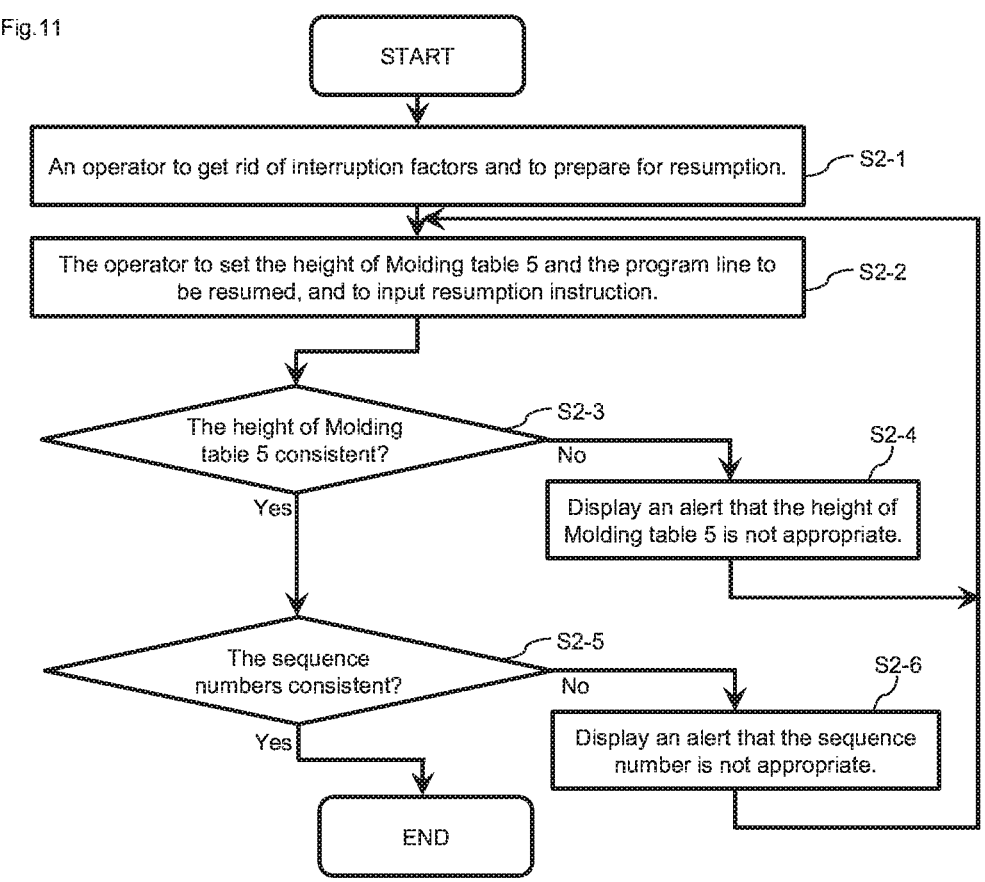

PROGRAM RESUMPTION METHOD OF A LAMINATION MOLDING APPARATUS

BACKGROUND OF THE INVENTION

Field of the Invention

The present invention relates to a lamination molding device and a program resumption method thereof.

In a lamination molding method of metal using laser beam, a very thin material powder layer is formed on a molding table capable of moving vertically, followed by irradiation on a predetermined area of the material powder layer with a laser beam, thereby sintering the material powder. These procedures are repeated to attain the desired three-dimensional shape of a sintered object integrally formed by laminating a plurality of sintered layers. Further, while molding of the object, machining may be applied to the surface or unnecessary portion of the sintered object obtained by sintering the material powder, using a rotary cutting tool capable of moving horizontally and vertically such as an end mill or the like.

[Patent Literature 1] JP 5721886

SUMMARY OF INVENTION

Technical Problem

While the lamination molding including each step of forming the material powder layer, sintering the material powder, and cutting to the sintered object, a program with respect to lamination molding, it being the main program, may be interrupted intentionally or due to an unexpected error such as an overload to the motor in the apparatus. In the case of emergency stop or error stop, the motor control signal controlling the position of a molding table is disconnected, so that the molding table becomes the non-controlled state and moves naturally due to empty weight or inertia thereof. In some interrupt timing, a recoater head, a device for forming a material powder layer, needs moving horizontally. In this case, the molding table may move to a position lower than a position at the time of interruption so as to avoid the collision between the recoater head and a lamination molding object formed so far.

When the interrupted main program is resumed, an operator may manually set the resumption position of the molding table, since the molding table position at the time of suspension and molding table position at the current time may be different. Likewise, the operator may manually set the sequence number of the program line in the main program. If such setting is mistaken, the molding process before the interruption may go to waste. Therefore, the operator is to restart the main program with care.

The present invention has been made in view of these circumstances. A lamination molding apparatus is provided, the apparatus being configured to compare the height of the molding table at present and height of the molding table appropriate for a timing of the resumption, and to compare the sequence number of the program line being resumed with the sequence number to be resumed.

Means to Solve the Problem

According to the present invention, a lamination molding apparatus, comprising a numerical control apparatus configured to form a desired lamination molding object by a repetition in accordance with a main program pre-created and numbered with a sequence number, the main program including a plurality of program lines, wherein: the repetition comprises forming a material powder layer of a predetermined thickness on a molding table for each divided layer, the molding table being vertically movable, the divided layer being obtained by dividing a shape of the desired lamination molding object at the predetermined thickness; and irradiating a predetermined area of the material powder layer with a laser beam to form a sintered layer, and wherein: the numerical control apparatus comprises: an operation unit to execute the main program in an order of the sequence number for each of the program lines; an storage unit to store the sequence number of the program lines; and a comparison unit to compare a first height and a second height, and to compare a first number and a second number when the main program is resumed after suspension of the main program, the first height being a height of the molding table at present, the second height being a height of the molding table appropriate for a timing of resumption, the first number being the sequence number of a program line to be resumed, the second number being the sequence number stored in the storage unit, is provided According to another aspect of the present invention, a program resumption method of a lamination molding apparatus, comprising: a starting step to start a main program including a plurality of program lines numbered with a sequence number; and for each of the program lines to form a sintered layer: a setting step to set a height of a molding table to a desired height, a recoating step to form a material powder layer of a predetermined thickness on the molding table for each divided layer, the divided layer being obtained by dividing a shape of the desired lamination molding object at the predetermined thickness, a sintering step to irradiate a predetermined area of the material powder layer with a laser beam, thereby sintering to form the sintered layer, and a storing step to store a sequence number of the program line; and further comprising: a comparing step to compare a first height and a second height, and to compare a first number and a second number when the main program is resumed after suspension of the main program, the first height being a height of the molding table at present, the second height being a height of the molding table appropriate for a timing of resumption, the first number being the sequence number of a program line to be resumed, the second number being the sequence number stored in the storing step, is provided.

Effect of the Invention

According to the present invention, even if the main program is interrupted, the main program can easily be resumed.

Hereinafter, various embodiments of the present invention will be provided. The embodiments provided below can be combined with each other.

Preferably, the storage unit further stores a height of the molding table, and the numerical control apparatus is configured to obtain the second height based on the height of the molding table stored.

Preferably, when each of the program lines is completed, the storage unit stores the sequence number of a completed program line and a height of the molding table at a point of completion of the completed program line.

Preferably, the storage unit further stores a cumulative number of the sintered layer; and the numerical control apparatus is configured to obtain the second height based on a difference between a height of the molding table at a start of molding, and a product of the cumulative number of the sintered layer and the predetermined thickness of the sintered layer.

Preferably, the storage unit stores, when each of the program lines is completed, the sequence number of a completed program line.

Preferably, after the main program is interrupted, in response to input of resumption instruction, the numerical control apparatus is configured to control a height of the molding table to be the second height, and resume the main program from a suspended program line.

Preferably, the numerical control apparatus is configured to, upon resumption of the main program, issue a predetermined warning when the first height and the second height are not consistent or the first number and the second number are not consistent.

Preferably, the numerical control apparatus is configured to, upon resumption of the main program, allow resumption of the main program when the first height and the second height are consistent, and the first number and the second number are consistent.

Preferably, in the storing step, a height of the molding table is further stored, and the second height is calculated based on the height of the molding table stored.

Preferably, when each of the program lines is completed, the sequence number of a completed program line and a height of the molding table at a point of completion of the completed program line are stored.

Preferably, a cumulative number of the sintered layer is further stored; and the second height can be obtained with a difference between a height of the molding table at a start of molding, and a product of the cumulative number of the sintered layer and the predetermined thickness of the sintered layer.

Preferably, when each of the program lines is completed, the sequence number of a completed program line is stored.

Preferably, after the main program is interrupted, in response to input of resumption instruction, the molding table is controlled to be the second height and the main program is resumed from a suspended program line.

Preferably, as a result of the comparing step, a predetermined warning is issued when the first height and the second height are not consistent or the first number and the second number are not consistent.

Preferably, as a result of the comparing step, resumption of the main program is allowed when the first height and the second height are consistent, and the first number and the second number are consistent.

BRIEF DESCRIPTION OF THE DRAWINGS

FIG. 10 is an example of the main program of the lamination molding apparatus according to one embodiment of the present invention.

FIG. 11 is a flowchart showing steps of resumption from suspension of the lamination molding apparatus according to one embodiment of the present invention.

DESCRIPTION OF THE PREFERRED EMBODIMENTS

Hereinafter, some embodiments of the present invention will be described with reference to the drawings. Here, the characteristic matters shown in the embodiments can be combined with each other.

Figure 1:
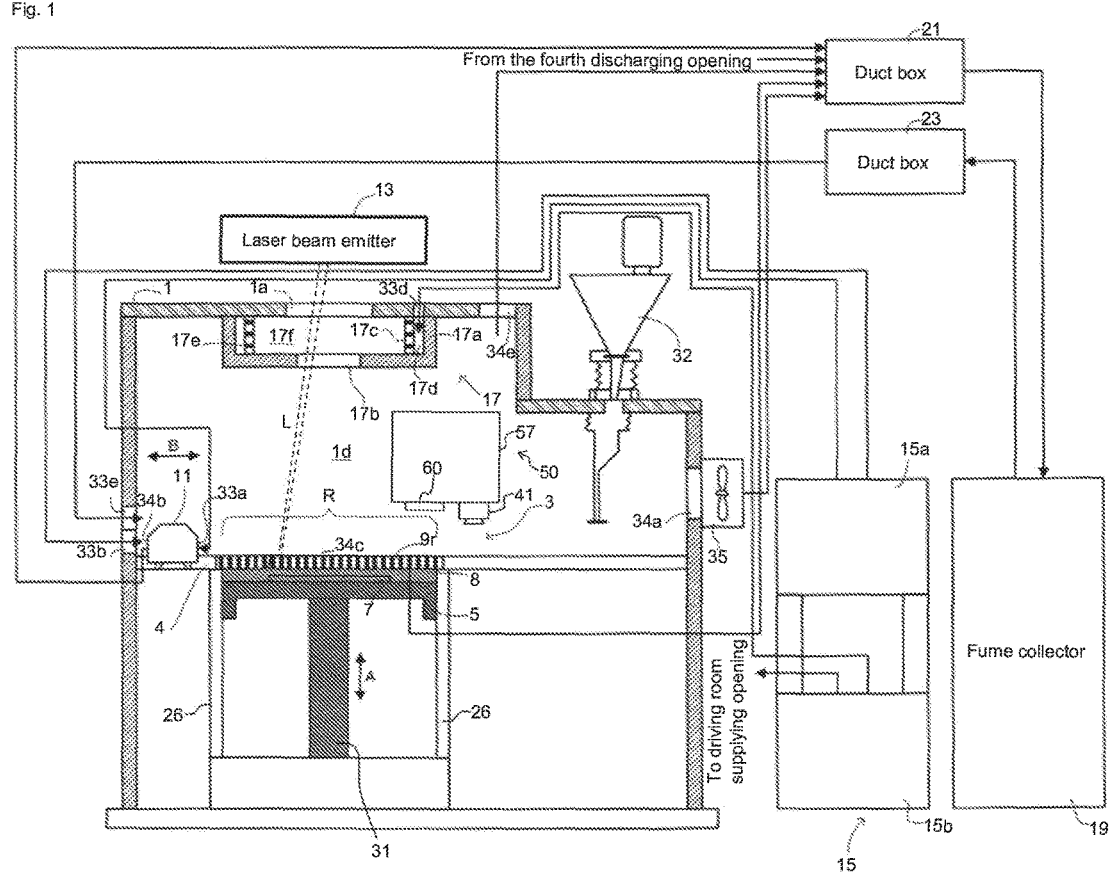
FIG. 1 is a schematic diagram of the lamination molding apparatus according to one embodiment of the present invention.
Figure 2:
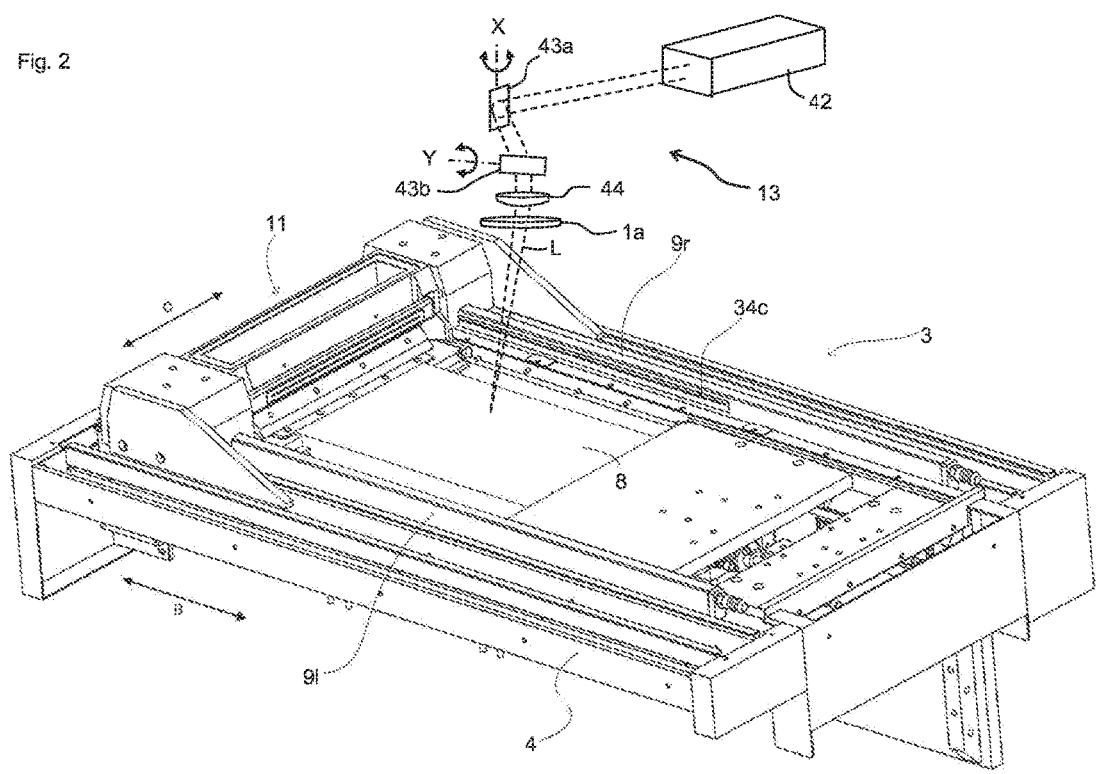
FIG. 2 is a perspective view showing a powder layer forming apparatus 3 and laser beam emitter 13 according to one embodiment of the present invention.

As shown in FIGS. 1 and 2, the lamination molding apparatus according to one embodiment of the present invention comprises a chamber 1 and a laser beam emitter 13.

The chamber 1 comprises a front chamber including a molding room 1d in which a lamination molded object is formed, and a rear chamber including a driving room which accommodates the most part of driving devices for moving a spindle head on which a rotary cutting tool is mounted to an arbitrary position in the molding room 1d. The molding room 1d and driving room are partitioned by stretchable bellows whereas a communicating portion, a slight clearance to allow inert gas to pass through, is provided between the molding room 1d and driving room. Note that in FIG. 1 the front chamber as seen from the front is shown but the rear chamber is not shown. The chamber 1 is configured to cover the required molding region R, and is filled with the inert gas of a predetermined concentration. A powder layer forming apparatus 3 is provided inside the chamber 1, and a fume diffusing device 17 is attached on the upper surface portion thereof. The powder layer forming apparatus 3 includes a base 4, a recoater head 11 and elongated members 9r and 9l.

The base 4 includes a molding region R in which a lamination molded object is formed. A molding table 5 is provided with the molding region R and is driven by a drive mechanism 31, thereby being capable of moving vertically (direction shown by arrow A in FIG. 1). When the lamination molding apparatus is operated, a molding plate 7 is arranged on the molding table 5, and a material powder layer 8 is formed thereon. A predetermined irradiation region existing in the molding region R is substantially consistent with the area surrounded by the contour of a desired three-dimensional molded object.

A powder retaining wall 26 is provided around the molding table 5, and the non-sintered material powder is retained in the powder retaining space surrounded by the powder retaining wall 26 and the molding table 5. Although not shown in FIG. 1, below the powder retaining wall 26, a powder discharging section capable of discharging the material powder in the powder retaining space may be provided.

In this case, after completion of the lamination molding, the molding table 5 is descended so as to discharge the non-sintered material powder from the powder discharging section. The material powder discharged is guided to the chute by the chute guide, and then the material powder is retained in the bucket via the chute.

Figure 3:
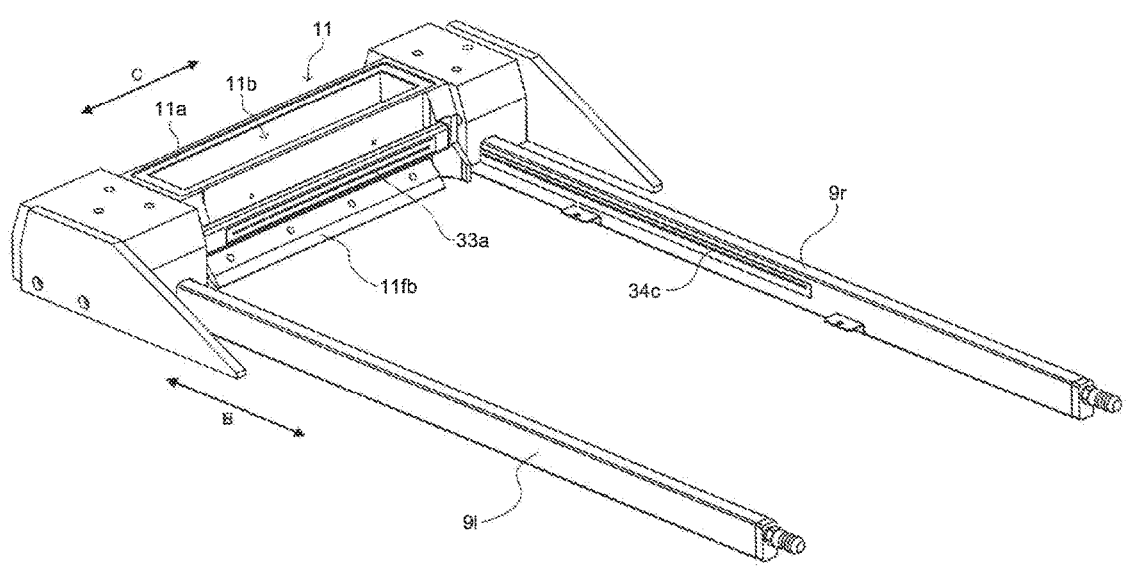
FIG. 3 is a perspective view of a recoater head 11 according to one embodiment of the present invention.
Figure 4:
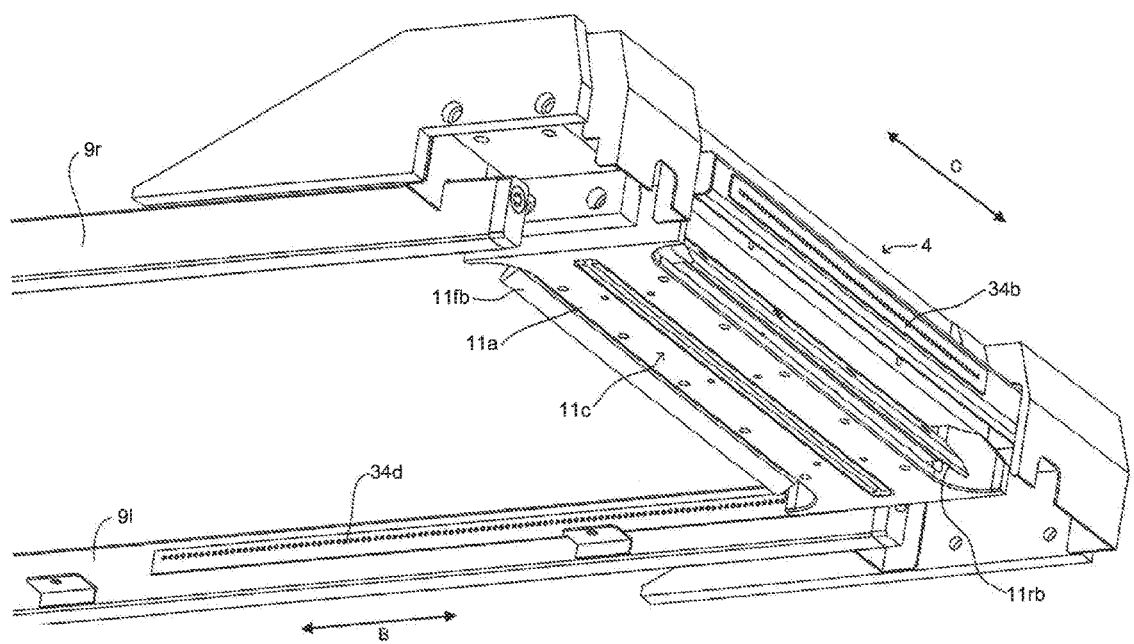
FIG. 4 is a perspective view of a recoater head 11 from another angle according to one embodiment of the present invention.

As shown in FIGS. 2 to 4, the recoater head 11 comprises a material holding section 11a, material supplying section 11b and material discharging section 11c.

The material holding section 11a stores the material powder. Note that the material powder is, for example, metal powder such as iron powder having a sphere shape with an average particle diameter of 20 μm. The material supplying section 11b is provided on the top surface of the material holding section 11a, and is configured to receive the material powder to be supplied from a material supplying device 32 to the material holding section 11a. The material discharging section 11c is provided on the bottom surface of the material holding section 11a, and discharges the material powder in the material holding section 11a. Note that the material discharging section 11c has a slit shape which elongates in the horizontal uniaxial direction (direction shown by arrow C) crossing orthogonally with the moving direction (direction shown by arrow B) of the recoater head 11.

Blades 11fb and 11rb, a first supplying opening 33a, and a second discharging opening 34b are provided on both sides of the recoater head 11. The blades 11fb and 11rb supply the material powder. In other words, the blades 11fb and 11rb form a material powder layer 8 by planarizing the material powder discharged from the material discharging section 11c. The first supplying opening 33a and second discharging opening 34b are provided along the horizontal uniaxial direction (direction shown by arrow C) crossing orthogonally with the moving direction (direction shown by arrow B) of the recoater head 11, thereby supplying and discharging the inert gas, respectively (details to be described later). Here, in the present specification, "inert gas" is a gas which substantially does not react with the material powder, and nitrogen gas, argon gas and helium gas can be mentioned for example.

The elongated members 9r and 9l are provided with a third discharging opening 34c and fourth discharging opening 34d along the moving direction (direction shown by arrow B) of the recoater head 11. The third discharging opening 34c and fourth discharging opening 34d allow fume to be discharged efficiently (details to be described later).

On the upper surface of the chamber 1, the fume diffusing device 17 is provided so as to cover a window 1a. The fume diffusing device 17 is provided with a cylindrical housing 17a and a cylindrical diffusing member 17c arranged in the cylindrical housing 17a. An inert gas supplying space 17d is provided in between the cylindrical housing 17a and the cylindrical diffusing member 17c. Further, on the bottom surface of the cylindrical housing 17a, an opening 17b is provided at the inner portion of the cylindrical diffusing member 17c. The cylindrical diffusing member 17c is provided with a plurality of pores 17e, and the clean inert gas supplied into the inert gas supplying space 17d is filled into a clean room 17f through the pores 17e. Then, the clean inert gas filled in the clean room 17f is blown out towards below the fume diffusing device 17 through the opening 17b.

A laser beam emitter 13 is provided above the chamber 1. The laser beam emitter 13 irradiates, with laser beam L, a predetermined area of the material powder layer 8 formed on the molding region R so as to sinter the material powder at the irradiation position. Specifically, the laser beam emitter 13 comprises a lasers beam source 42, two-axis galvanometer mirrors 43a and 43b, and a condensing lens 44. The galvanometer mirrors 43a and 43b includes actuators rotating the galvanometer mirrors 43a and 43b, respectively.

The laser beam source 42 emits the laser beam L. The type of the laser beam L is a laser beam capable of sintering the material powder. For example, $CO_2$ laser, fiber laser, YAG laser and the like can be used.

The two-axis galvanometer mirrors 43a and 43b perform two dimensional scanning of the laser beam L emitted from the laser beam source 42 controllably. The galvanometer mirror 43a scans the laser beam L in the direction shown by arrow B (X-axis direction), and the galvanometer mirror 43b scans the laser beam L in the direction shown by arrow C (Y-axis direction). Each of the galvanometer mirrors 43a and 43b is controlled of its rotation angle depending on the size of the rotation angle controlling signal input from a control device (not shown). Accordingly, the laser beam L can be emitted to a desired position by altering the size of the rotation angle controlling signal being input to each of the actuators of the galvanometer mirrors 43a and 43b.

The condensing lens 44 is, for example fθ lens, to condense the laser beam L emitted from the laser beam source 42. Note that, the condensing lens 44 may be arranged between the laser beam source 42, and the galvanometer mirrors 43a and 43b along the laser beam L.

The laser beam L which passed through the galvanometer mirror 43a and 43b and the condensing lens 44 further passes through the window 1a provided to the chamber 1. Then, the material powder layer 8 formed in the molding region R is irradiated with the laser beam L. The window 1a is formed with a material capable of transmitting the laser beam L. For example, in a case where the laser beam L is fiber laser or YAG laser, the window 1a can be structured with a quartz glass.

Next, the inert gas supplying/discharging system is explained. The inert gas supplying/discharging system comprises the fume diffusing device 17, an inert gas supplying apparatus 15, a fume collector 19, and duct boxes 21 and 23. In the inert gas supplying/discharging system, the chamber 1 is supplied with the inert gas so as to be constantly filled with a predetermined concentration or more of the inert gas while the inert gas contaminated with fume generated by the irradiation of the laser beam L are discharged to the outside of the chamber 1.

The inert gas supplying/discharging system comprises a plurality of supplying openings and discharging openings of the inert gas, provided to the chamber 1, and pipes connecting each of the supplying openings and discharging openings, and the inert gas supplying apparatus 15 and the fume collector 19. The supplying openings of the present embodiment comprise a first supplying opening 33a, second supplying opening 33b, sub supplying opening 33e, fume diffusing device supplying opening 33d and driving room supplying opening (not shown). The discharging openings of the present embodiment comprise the first discharging opening 34a, second discharging opening 34b, third discharging opening 34c, fourth discharging opening 34d and a sub discharging opening 34e.

The first supplying opening 33a is provided so as to depend on the installation position of the first discharging opening 34a and to face the first discharging opening 34a. Desirably, the first supplying opening 33a is provided on one side of the recoater head 11 along the direction shown by arrow C so as to face the first discharging opening 34a when the recoater head 11 is positioned on the opposite side across a predetermined irradiation region with respect to a position at which the material supplying device 32 is installed.

The first discharging opening 34a is provided on the side wall of the chamber 1 at a certain distance from a predetermined irradiation region so as to face the first providing opening 33a. A suction device 35 is provided connecting with the first discharging opening 34a. The suction device 35 facilitates eliminating the fume efficiently from the optical path of the laser beam L. In addition, the suction device 35 enables a greater amount of fumes to be discharged through the first discharging opening 34a, thereby the fume diffusion within the molding room 1d is alleviated.

The second supplying opening 33b is provided on the edge of the base 4 so as to face the first discharging opening 34a across a predetermined irradiation region. The second supplying opening 33b is selectively switched to open, but instead the first supplying opening 33a is switched to close when the recoater head 11 is positioned on the opposite side with respect to the first supplying opening 33a, without placing a predetermined irradiation region therebetween. The second supplying opening 33b supplies the inert gas into the first discharging opening 34a, of which pressure and flow rate are the same as the inert gas supplied from the first supplying opening 33a, thereby generating a flow of the inert gas in the same direction. Consequently, stable sintering is beneficially provided.

The second discharging opening 34b is provided on the opposite side of the side in which the first supplying opening 33a is provided, of recoater head 11 along the direction shown by arrow C. While the first supplying opening 33a does not supply the inert gas, in other words, the second supplying opening 33b supplies the inert gas, some fume is discharged by generating a flow of the inert gas in the more vicinity of a predetermined irradiation region, thereby eliminating the fume more efficiently from the optical path of the laser beam L.

The third discharging opening 34c and fourth discharging opening 34d are provided on the elongated members 9r and 9l respectively along the direction shown in arrow B within a range not exceeding the maximum supply amount of the inert gas in the inert gas supplying/discharging system. In the case where a predetermined region is larger and then an irradiation spot of the laser beam L exists at the front-side or rear-side edge of the predetermined irradiation region, the fume may fail to be carried by a flow of the inert gas formed from the first supplying opening 33a or second supplying opening 33b toward the first discharging opening 34a, consequently the fume may drift. The third discharging opening 34c and fourth discharging opening 34d enable the fume to be discharged more efficiently.

The inert gas supplying/discharging system of the present embodiment comprises the sub supplying opening 33e, fume diffusing device supplying opening 33d, driving room supplying opening (not shown) and sub discharging opening 34e. The sub supplying opening 33e is provided on the side wall of the chamber 1 so as to face the first discharging opening 34a, and supplies clean inert gas, of which the fume is removed, sent from the fume collector 19 into the molding room 1d. The fume diffusing device supplying opening 33d is provided on the upper surface of the chamber 1 and supplies the inert gas into the fume diffusing device 17. The driving room supplying opening is provided on the rear chamber of the chamber 1, and supplies the inert gas into the driving room (not shown). The sub discharging opening 34e is provided above the first discharging opening 34a, and discharges the inert gas containing a large amount of fume which remains on the upper side of the chamber 1.

On the upper surface of the chamber 1, the fume diffusing device 17 is provided so as to cover the window 1a. The fume diffusing device 17 is provided with a cylindrical housing 17a and a cylindrical diffusing member 17c arranged in the cylindrical housing 17a. An inert gas supplying space 17d is provided in between the cylindrical housing 17a and the cylindrical diffusing member 17c. Further, on the bottom surface of the cylindrical housing 17a, an opening 17b is provided at the inner portion of the cylindrical diffusing member 17c. The cylindrical diffusing member 17c is provided with a plurality of pores 17e, and the clean inert gas supplied into the inert gas supplying space 17d via the fume diffusing device supplying opening 33d is filled into a clean room 17f through the pores 17e. Then, the clean inert gas filled in the clean room 17f is discharged towards below the fume diffusing device 17 through the opening 17b. The clean inert gas discharged flows out along the optical path of the laser beam L, and eliminates the fume from the optical path of the laser beam L, thereby preventing the window 1a from being contaminated with the fume.

The inert gas supplying system to supply the inert gas into the chamber 1 is connected with the inert gas supplying apparatus 15 and fume collector 19. The inert gas supplying apparatus 15 has a function to supply the inert gas, and is, for example, a device comprising a membrane type nitrogen separator to extract the nitrogen gas from the circumambient air. The inert gas supplying apparatus 15 of the present embodiment comprises a first inert gas supplying apparatus 15a to supply the inert gas through the first supplying opening 33a and second supplying opening 33, and a second inert gas supplying apparatus 15b to supply the inert gas through the fume diffusing device supplying opening 33d and driving room supplying opening (not shown). Preferably, the first inert gas supplying apparatus 15a is capable of controlling the concentration of the inert gas. The second inert gas supplying apparatus 15b may be an apparatus having the same structure as the first inert gas supplying apparatus 15a, or may not have a function to control the concentration of the inert gas since it connects with the supplying openings in a relatively distant position from the molding region R and the control of the concentration of the inert gas is not of importance relatively. The fume collector 19 comprises duct boxes 21 and 23 provided at its upper stream side and its lower stream side, respectively. The inert gas containing fume discharged from the chamber 1 is sent to the fume collector 19 through the duct box 21. Then, fume is removed in the fume collector 19, and the cleaned inert gas is sent to the sub supplying opening 33e of the chamber 1 through the duct box 23. According to such constitution, the inert gas can be recycled.

For the inert gas supplying system as shown in FIG. 1, the first inert gas supplying apparatus 15a is respectively connected with the first supplying opening 33a and second supplying opening 33b. Then, the second inert gas supplying apparatus 15b is respectively connected with the fume diffusing device supplying opening 33d and driving room supplying opening (not shown). Further, the fume collector 19 and sub supplying opening 33e are connected through the duct box 23. The first inert gas supplying apparatus 15a and second inert gas supplying apparatus 15b have their control valves opened by a predetermined amount through a control device, thereby supplying each of the clean inert gas having a predetermined pressure and flow rate into the chamber 1. The inert gas supplied into the chamber 1 is supplied into the molding room 1d through a communication unit positioned between the molding room 1d and driving room (not shown).

In the lamination molding apparatus of the present embodiment, when a door provided at an opening communicating with the molding room 1d is opened, the control device detects opening state of the door by a door detector (not shown) capable of detecting opening/closing of the door, and stops the first inert gas supplying apparatus 15a whereas the second inert gas supplying apparatus 15b is configured to continue supplying the inert gas. While the door is open, the inert gas diffuses into the atmosphere even if supplying the inert gas into molding room 1d. Therefore, by stopping the supply of the inert gas into the molding room 1d while the door is open, the wasteful supply of the inert gas can be suppressed.

For the inert gas discharging system as shown in FIG. 1, the first discharging opening 34a, second discharging opening 34b, third discharging opening 34c, fourth discharging opening 34d and sub discharging opening 34e, fourth discharging opening 34d and sub discharging opening 34e are respectively connected with the fume collector 19 through the duct box 21. The inert gas after removal of the fume by the fume collector 19 returns to the chamber 1 and is recycled.

(Lamination Molding Method)

Next, referring to FIGS. 1 and 5-7, the lamination molding method using the afore-mentioned lamination molding apparatus will be explained. Note that the inert gas supplying/discharging system is not shown in FIG. 5-7.

Figure 5:
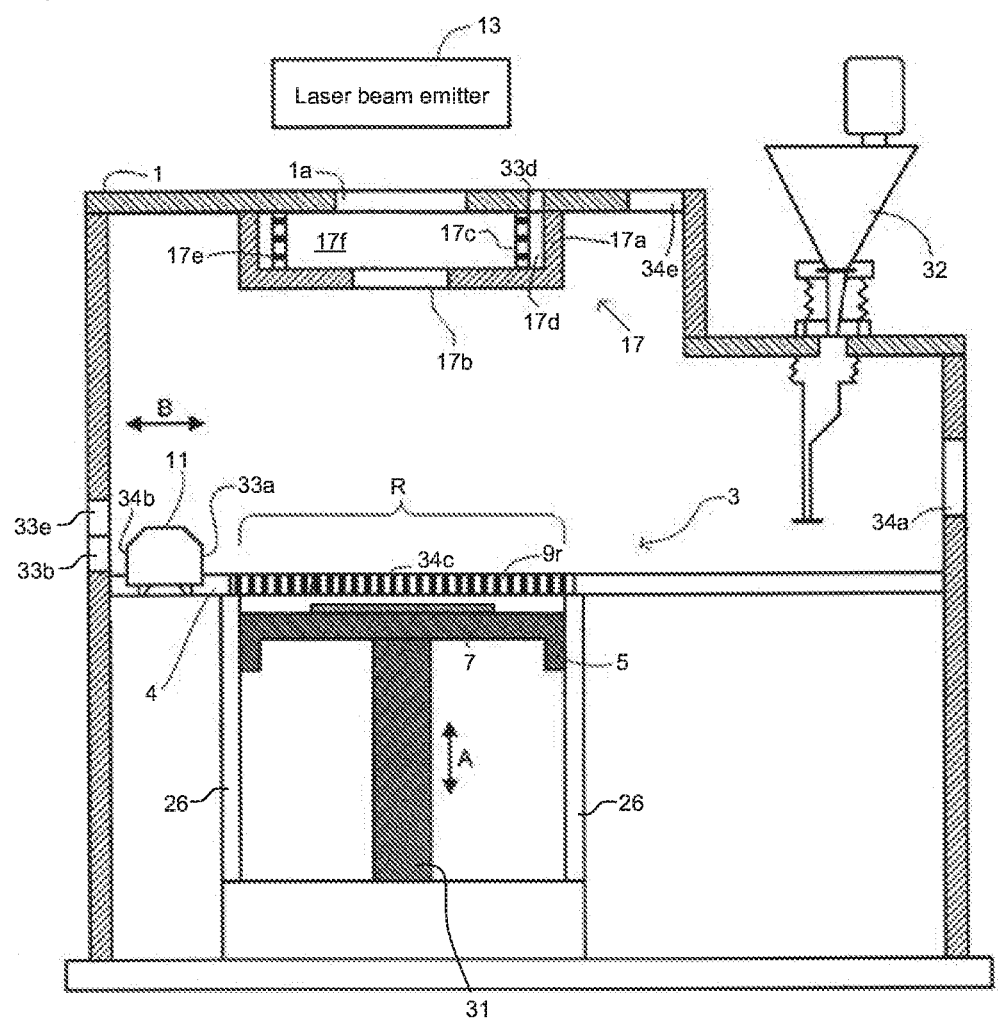
FIG. 5 is a diagram for explaining a lamination molding method using a lamination molding apparatus according to one embodiment of the present invention.

First, the molding plate 7 is placed on the molding table 5, and the height of the molding table 5 is adjusted to an appropriate position (as shown in FIG. 5). In this state, the recoater head 11 with the material holding section 11a being filled with the material powder is moved from the left side to the right side of the molding region R, in the direction shown by arrow B in FIG. 5. Accordingly, a first layer of the material powder layer 8 is formed on the molding plate 7.

Figure 6:
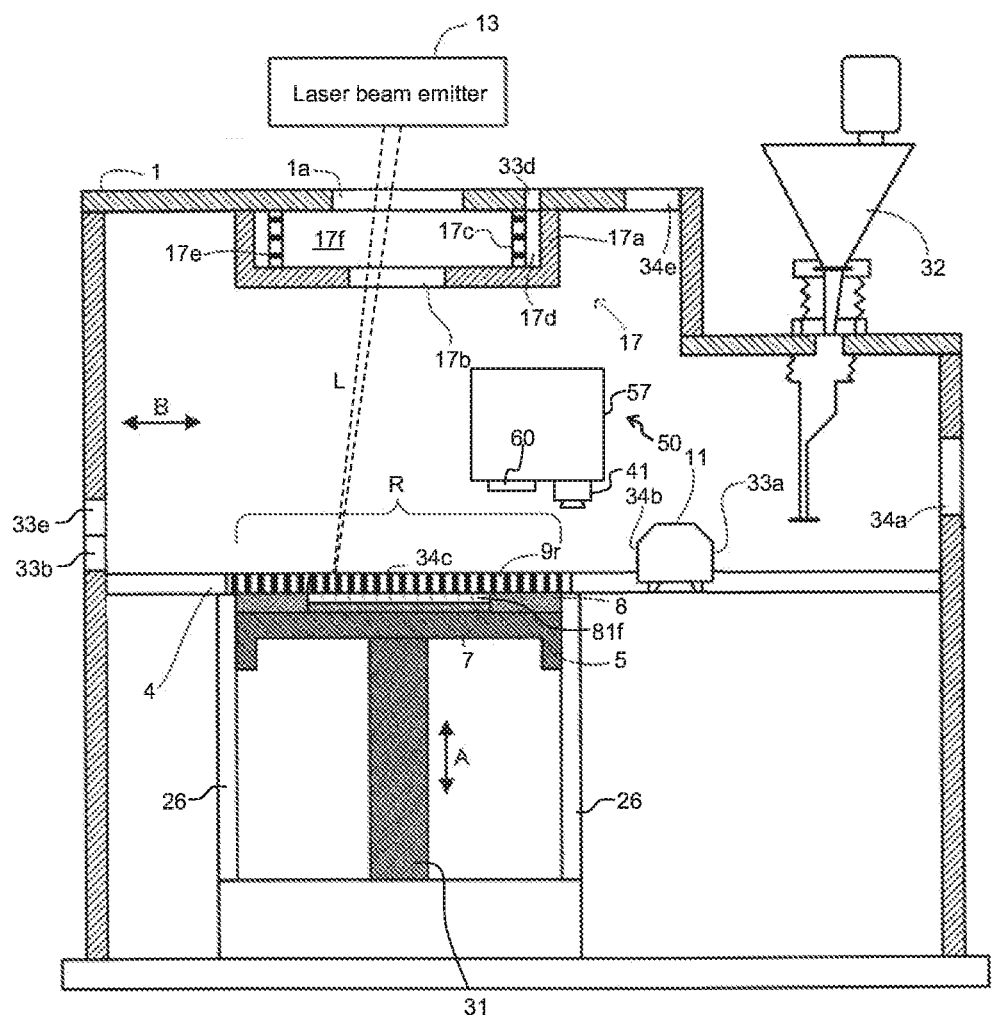
FIG. 6 is a diagram for explaining the lamination molding method using the lamination molding apparatus according to one embodiment of the present invention.

Subsequently, predetermined portion of the material powder layer 8 is irradiated with the laser beam L, thereby sintering the portion of the material powder layer 8 being irradiated with the laser beam. Accordingly, the first layer of sintered layer 81f being a divided layer having a predetermined thickness with respect to an entire lamination molded object is obtained as shown in FIG. 6.

Then, the height of the molding table 5 is descended by the predetermined thickness (one layer) of the material powder layer 8. Subsequently, the recoater head 11 is moved from the right side to the left side of the molding region R. Accordingly, a second layer of the material powder layer 8 is formed on the sintered layer 81f.

Figure 7:
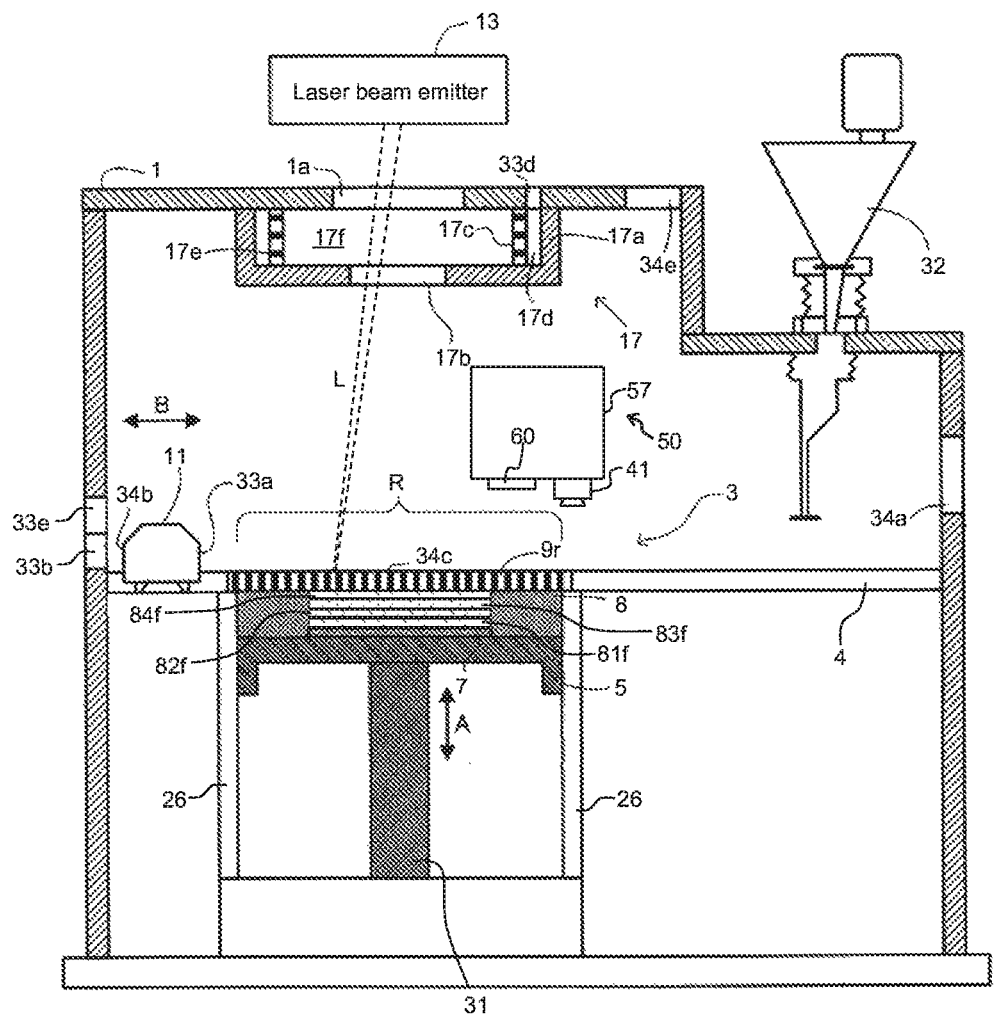
FIG. 7 is a diagram for explaining the lamination molding method using the lamination molding apparatus according to one embodiment of the present invention.

Next, predetermined portion of the material powder layer 8 is irradiated with the laser beam L, thereby sintering the portion of the material powder layer 8 being irradiated with the laser beam. Accordingly, the second layer of sintered layer 82f is obtained as shown in FIG. 7.

By repeating these procedures, the third layer of sintered layer 83f, the fourth layer of sintered layer 84f, and the sintered layers thereafter are formed. The adjacent sintered layers are firmly fixed with each other.

Preferably, for the purpose of enhancing the surface accuracy of a sintered object, every time the cumulative number of the sintered layers reaches the predetermined number, a cutting step to perform cutting to the sintered layer by the mounted rotary cutting tool attached to the spindle head 60 may be performed.

Non-sintered material powder is removed after forming a desired number of the sintered layers, thereby the molded sintered object can be obtained. The sintered object is applicable to a mold for the resin molding for example.

Figure 8:
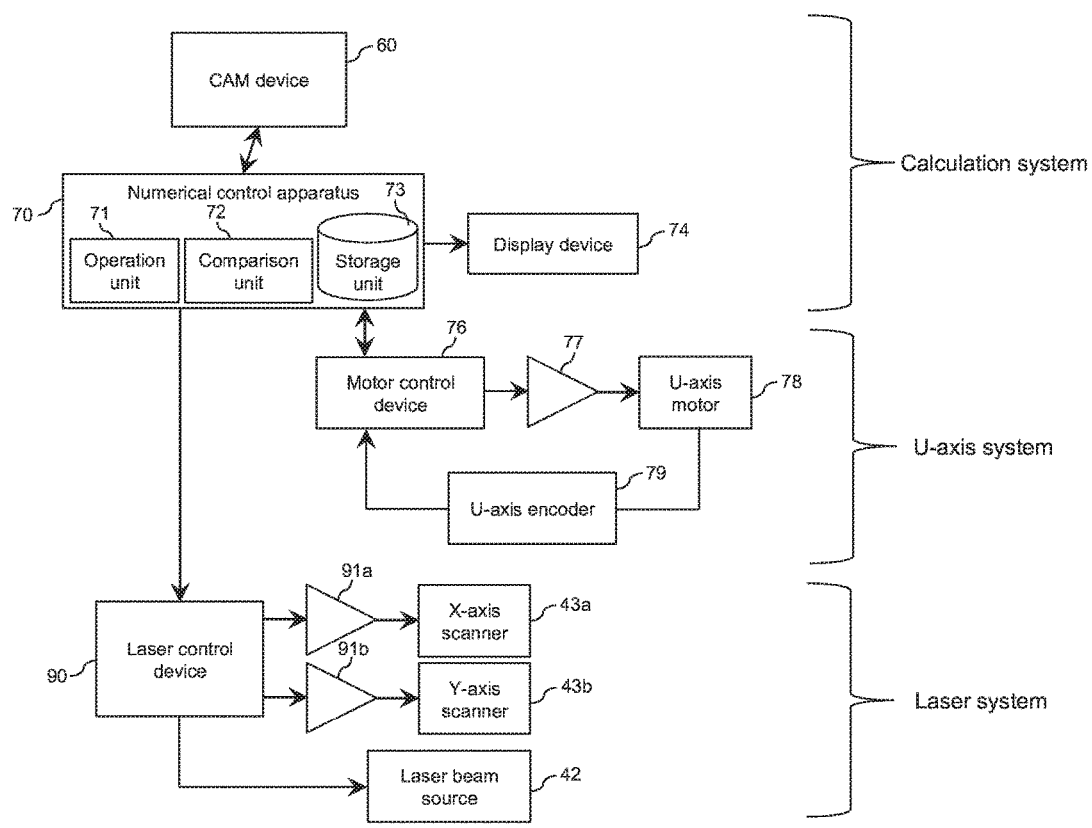
FIG. 8 is a block diagram showing a control system of the lamination molding apparatus according to one embodiment of the present invention.

Next, referring to FIG. 8, a control system of the lamination molding apparatus will be explained. As shown in FIG. 8, the control system comprises a calculation system, U-axis system and laser system.

(Calculation System)

A CAM (Computer Aided Manufacturing) device 60 generates a project file including a main program for forming a desired lamination molding object, cutting program file and molding program file (laser irradiation program file). Note that the main program comprises a plurality of program lines numbered with a sequence number, and further each of the program line comprises a sintering command with respect to the sintered layer of a predetermined layer, a cutting command with respect to the sintered layer of the predetermined layer or the like. Specific commands with respect to a cutting route of the rotary cutting tool or the irradiation position of the laser beam L or the like in the respective divided layers are included in the cutting program or molding program file.

The numerical control apparatus 70 controls each part of the lamination molding apparatus. As will be described in detail later, the control includes controlling the height of the molding table 5 according to the main program, previously created, having a plurality of the program lines numbered with the sequence number, and outputting the command of the start of the irradiation to a laser control device 90, the command being to designate a divided layer to be irradiated. The numerical control apparatus 70 is configured to read the project file generated by the CAM device 60, the project file including the main program file, cutting program file and molding program file (laser irradiation program file), via a removable storage medium such as a flash memory, a communication line and the like. Further, the numerical control apparatus 70 comprises an operation unit 71, comparison unit 72 and storage unit 73.

The operation unit 71 executes a variety of calculations pertinent to a numerical control. For example, the operation unit 71 analyzes the main program file and cutting program file, and outputs a command signal to each control device to execute the main program for each program line.

The comparison unit 72 compares a first height and second height, and compares a first number and second number when the main program is resumed after suspension of the main program, the first height being a height of the molding table 5 at present, the second height being a height of the molding table 5 appropriate for a timing of resumption, the first number being the sequence number of the program line to be resumed, the second number being the sequence number stored in the storage unit 73. Note that details of such contents will be described later as a flow of the resumption from the suspension as shown in FIG. 11.

The storage unit 73 stores data regarding the numerical control apparatus 70, temporary variable values with respect to the operation of the operation unit 71, and the like. For example, the storage unit 73 stores the height of the molding table 5 and the sequence number. Specifically, for example, since a displacement amount of a U-axis motor 78 depends on the height of the molding table 5, the height of the molding table 5 may be indirectly compared by detecting, storing and comparing the amount of displacement.

A display device 74 being connected to the numerical controller 70 displays, on the screen, data regarding the numerical control device 70 and error messages indicating the height of the molding table 5 at present being inappropriate. The details of the latter will be described later as a flow of the resumption from the suspension as shown in FIG. 11.

(U-Axis System)

A motor control device 76 being connected to the numerical controller 70 is configured to receive the height of the molding table 5 included in each of the program lines of the main program.

The motor control device 76 transmits a desired command signal to a driver 77 based on the main program, and the driver 77 transmits a drive current having magnitude corresponding to the command signal to the U-axis motor 78. The U-axis motor 78 is driven by the drive current, and as a result, the molding table 5 is vertically moved.

Further, the U-axis motor 78 being connected to a U-axis encoder 79 is configured so that the motor control device 76 obtains a feedback with respect to the position information of the U-axis motor 78. Since the numerical control apparatus 70 is connected to the motor control device 76, the position information of the U-axis motor 78 can be read out.

(Laser System)

The laser control device 90 being connected to the numerical controller 70 receives the molding program file from the numerical control apparatus 70 and analyzes the molding program file, thereby generating laser beam irradiation data.

The laser control device 90 transmits a desired command signal to the drivers 91a and 91b based on the laser beam irradiation data, and the drivers 91a and 91b transmit drive current having magnitude corresponding to each of the command signals to each actuator of the galvanometer mirrors 43a and 43b. The galvanometer mirrors 43a and 43b face the desired rotation angle due to the drive current such that the irradiation position of the laser beam L on the molding table 5 is determined.

In addition, the laser control device 90 transmits the other command signal to the laser beam source 42, and controls ON/OFF of the laser beam L emitted from the laser beam source 42 and the output thereof.

[Main Program Execution Flow]

Figure 9:
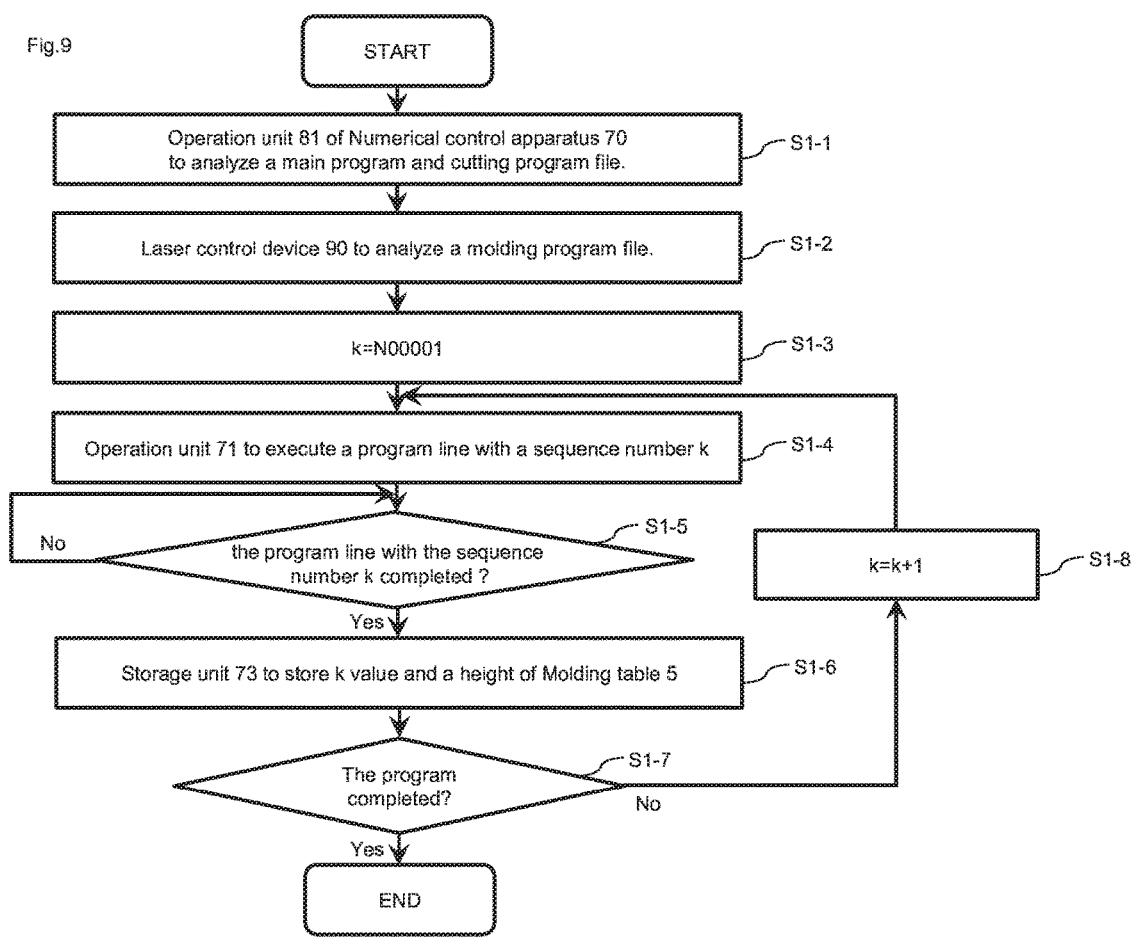
FIG. 9 is a flowchart showing steps of the main program of the lamination molding apparatus according to one embodiment of the present invention.

Next, the execution flow of the main program will be explained with reference to FIGS. 9 and 10. In FIG. 10, an example of the main program is excerpted.

(Step S1-1)

The numerical control apparatus 70 reads out the project file, which includes the main program file, cutting program file and molding program file. The project file is generated by the CAM device 60 so as to form a desired lamination molding object. The main program and cutting program file are analyzed by the operation unit 71 and stored in the storage unit 73.

(Step S1-2)

The numerical control apparatus 70 transmits the molding program file to the laser control device 90. The laser control device 90 analyzes the molding program file and generates the laser beam irradiation data.

(Steps S1-3 and S1-4)

Subsequently, the operation unit 71 reads the main program stored in the storage unit 73 and executes the program line with the sequence number k. An initial value of k is N00001. Like the program line in the example as shown in FIG. 10, the sequence numbers are given as N00001, N00002, . . . in order of programs to be executed. The program line includes the sintering command with respect to the sintered layer of a predetermined layer, the cutting command with respect to the sintered layer of the predetermined layer, or the like. According to these commands, the numerical control apparatus 70 and laser control device 90 output specific commands to each part or section based on the cutting program and laser beam irradiation data. For example, N00010 in FIG. 10 is a program instructing formation of the fifth sintered layer. When this program is executed, the height of the molding table 5 is descended by a predetermined thickness of each divided layer, and the material powder layer 8 with a predetermined thickness is formed by the recoater head 11 of the powder layer forming apparatus 3. Then, a command is output such that the laser beam emitter 13 irradiates the predetermined irradiation position on the material powder layer 8 with the laser beam L of required energy so as to form the sintered layer.

(Steps S1-5 and S1-6)

Upon completion of the program line under execution, the sequence number and the height of the molding table 5 on sintering in the program line are stored in the storage unit 73. In FIG. 10, for example, N00006 is stored in the storage unit 73 upon completion of the program line of k=N00006. In the main program, some lines from the first line to a predetermined line functions as a command with respect to an initial setting for the molding. For example, in the program as shown in FIG. 10, from N00001 to N00005 are commands such as macro calling and positioning. Then, an actual lamination molding command is described after N00006. Therefore, it can be configured to start storing the sequence number and height of the molding table 5 when the actual lamination molding command, i.e., the sintering command of the first sintered layer is completed (completion time of the program line of k=N00006 in FIG. 10).

(Steps S1-7 and S1-8)

The operation unit 71 continues executing each program line in the order of the sequence number until the last program line is completed. Note that a command to end the program is described in the last program line.

As mentioned above, during the lamination molding process including steps of forming the material powder layer 8, sintering the material powder, the cutting to the sintered object and the like, the main program as described above may be interrupted intentionally or due to unexpected error such as excess load to the motor in the device.

[Resumption Flow at the Time of Suspension]

Hereinafter, a program resumption method, being a flow of resuming the interrupted main program, will be described along each step as shown in FIG. 11.

(Step S2-1)

An operator gets rid of interruption factors and prepares for the resumption. For example, when interrupting in the process of forming the sintered layer, at a timing of resumption, it is necessary to cut and remove the incomplete sintered layer of the certain layer before the resumption in order to resume the molding from the forming process of the material powder layer 8 in the certain layer. It is known that a resumption of sintering from the interrupted irradiation position without removing the incomplete sintered layer forms a weld line where the material powder being irradiated by laser meets the incomplete sintered layer. The weld line is likely to adversely affect forming the next material powder layer 8 or the next sintered layer.

(Step S2-2)

The operator sets the height of the molding table 5 and the sequence number of the program line to be resumed, and then the position of the molding table 5 moves to a position appropriate for the resumption of the molding. Also, the operator inputs a resumption instruction.

(Steps S2-3 and S2-4)

The comparison unit 72 compares the height of the molding table 5 set by the operator (i.e., the height of the molding table 5 at present) and the height of the molding table 5 stored in the storage unit 73 upon suspension. If these values with respect to height of the molding table 5 are not consistent, the display device 74 displays an error message stating that the height of the molding table 5 at present is not appropriate. Note that the height of the molding table 5 being consistent means that the height of the molding table 5 stored in the storage unit 73 at the time of suspension is numerically equal to the height of the molding table 5 set by the operator.

(Steps S2-5 and S2-6)

The comparison unit 72 compares the sequence number of the program line to be resumed set by the operator and the sequence number stored in the storage unit 73 upon suspension. If these sequence numbers are not consistent, the display device 74 displays an error message stating that the sequence number of the program line set by the operator to be resumed is not appropriate. Note that the sequence numbers being consistent means that a sequence number obtained by adding 1 to the sequence number stored in the storage unit 73 at the time of interruption is numerically equal to the sequence number set by the operator. For example, when interrupting while executing N00010, since N00009 is stored as the sequence number in the storage unit 73. Therefore, if N00010 is set as the program line to be executed at the time of resumption, the sequence numbers may be consistent. It may be configured to resume after displaying the error message without resetting the height of the molding table 5 or the program line to be resumed such that the height of the molding table 5 or the program line to be resume may intentionally be changed and the main program line may be executed.

Through such resumption flow, the numerical control apparatus 70 allows the main program to be resumed. As a result, even if there is a setting mistake by the operator at the time of resumption instruction, it enables to recognize and correct the setting mistake before execution. Therefore, waste of the material powder and time due to a molding failure can be reduced compared to conventional moldings.

Note that each program line to form the sintered layer according to the present invention includes commands to descend the height of the molding table 5 by a predetermined thickness so as to form a material powder layer 8 of a predetermined thickness on the molding table 5, and to form one sintered layer by irradiating a predetermined area of the material powder layer 8 with a laser beam L. It should also be noted that the numerical controller 70 is configured to resume the main program from the beginning of the interrupted program line.

The present invention can be implemented in following manners.

First, in Step S2-2 as shown in FIG. 11, setting by the operator of the height of the molding table 5 and the program line to be resumed may be skipped. In such a case, instead of Steps S2-3 to S2-6, as a trigger of the input of resumption instruction by the operator, the molding table 5 moves so as to be the height of the molding table 5 stored in the storage unit 73, and the main program is resumed from the program line of the sequence number obtained by adding 1 to the sequence number stored in the storage unit 73.

Secondly, in the above embodiment, although a pair of the galvanometer mirrors 43a and 43b are selected as a scanning means of the laser beam L, the laser beam L may also be scanned by another means.

Thirdly, displaying the error message by the display device 74 may be replaced with another method to alert an inappropriate state (for example, sounding a predetermined warning), or the combination thereof.

Fourthly, it may be configured to calculate the height of the molding table 5 using the difference between the height of the molding table 5 at the start of molding, and the product of the cumulative number of the sintered layer and the predetermined thickness of the material powder layer 8, instead of the height of the molding table 5 stored.

Fifthly, the execution order of Steps S2-3 to S2-4, and Steps S2-5 to S2-6 as shown in FIG. 11 may be reversed.

Sixthly, in the above embodiment, the height of the molding table 5 and the sequence number are stored upon completion of each program line; however, the timing of storing the height of the molding table 5 and/or the sequence number may be changed. For example, instead of upon completion of each the program line, it may be configured to store the height of the molding table 5 and the sequence number at the beginning of each program line. In such a case, the sequence numbers being consistent means that the sequence number itself stored in the storage unit 73 at the time of suspension is numerically equal to the sequence number set by the operator. That is, the sequence numbers being consistent means that the first number is numerically equal to the number obtained by adding 1 to the second number when the second number is stored upon completion of each program line, or that the first number is numerically equal to the second number when the second number is stored at the beginning of each program line.

EXPLANATION OF SYMBOLS

1: chamber
1a: window
1d: molding region
3: powder layer forming apparatus
4: base
5: molding table
7: molding plate
8: material powder layer
9l, 9r: elongated member
11: recoater head
11a: material holding section
11b: material supplying section
11c: material discharging section
11fb, 11rb; blade
13: laser beam emitter
15: inert gas supplying apparatus
15a: first inert gas supplying apparatus
15b: second inert gas supplying apparatus
17: fume diffusing device
17a: cylindrical housing
17b: opening
17c: cylindrical diffusing member
17d: inert gas supplying space
17e: pore
17f: clean room
19: fume collector
21, 23: duct box
26: powder retaining wall
31: drive mechanism
32: material supplying device
33a: first supplying opening
33b: second supplying opening
33d: fume diffusing device supplying opening
33e: sub supplying opening
34a: first discharging opening
34b: second discharging opening
34c: third discharging opening
34d: fourth discharging opening 34e: sub discharging opening
35: suction device
42: laser beam source
43a, 43b: galvanometer mirror
44: condensing lens
60: CAM device
70: numerical control apparatus
71: operation unit
72: comparison unit
73: storage unit
74: display device
76: motor control device
77: driver
78: U-axis motor
79: U-axis encoder
81f, 82f, 83f, 84f: sintered layer
90: laser control device
91a, 91b: driver
L: laser beam
R: molding region

What is claimed is:

1. A program resumption method of a lamination molding apparatus, comprising:
   a starting step to start a main program including a plurality of program lines numbered with a sequence number; and
   for each of the program lines to form a sintered layer:
   a setting step to set a height of a molding table to a desired height,
   a recoating step to form a material powder layer of a predetermined thickness on the molding table for each divided layer, the divided layer being obtained by dividing a shape of the desired lamination molding object at the predetermined thickness,
   a sintering step to irradiate a predetermined area of the material powder layer with a laser beam, thereby sintering to form the sintered layer, and
   a storing step to store a sequence number of the program line; and further comprising:
   a comparing step to compare a first height and a second height, and to compare a first number and a second number when the main program is resumed after suspension of the main program, the first height being a height of the molding table at present, the second height being a height of the molding table appropriate for a timing of resumption, the first number being the sequence number of a program line to be resumed, the second number being the sequence number stored in the storing step.

2. The method of claim 1, wherein in the storing step, a height of the molding table is further stored, and the second height is calculated based on the height of the molding table stored.

3. The method of claim 2, wherein when each of the program lines is completed, the sequence number of a completed program line and a height of the molding table at a point of completion of the completed program line are stored.

4. The method of claim 1, wherein a cumulative number of the sintered layer is further stored; and
   the second height can be obtained with a difference between a height of the molding table at a start of molding, and a product of the cumulative number of the sintered layer and the predetermined thickness of the sintered layer.

5. The method of claim 4, wherein when each of the program lines is completed, the sequence number of a completed program line is stored.

6. The method claim 1, wherein after the main program is interrupted, in response to input of resumption instruction, the molding table is controlled to be the second height and the main program is resumed from a suspended program line.

7. The method of claim 1, wherein as a result of the comparing step, a predetermined warning is issued when the first height and the second height are not consistent or the first number and the second number are not consistent.

8. The method of claim 1, wherein as a result of the comparing step, resumption of the main program is allowed when the first height and the second height are consistent, and the first number and the second number are consistent.

* * * * *